US012574213B2

(12) United States Patent
Singh et al.

(10) Patent No.: US 12,574,213 B2
(45) Date of Patent: Mar. 10, 2026

(54) KEY-BASED GENERATIVE ARTIFICIAL INTELLIGENCE MODEL CONTENT GENERATION

(71) Applicant: Sony Group Corporation, Tokyo (JP)

(72) Inventors: Mayank Kumar Singh, Tokyo (JP); Naoya Takahashi, Zurich (CH)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 18/813,517

(22) Filed: Aug. 23, 2024

(65) Prior Publication Data

US 2026/0058796 A1 Feb. 26, 2026

(51) Int. Cl.
*H04L 29/06* (2006.01)
*H04L 9/08* (2006.01)
*H04L 9/32* (2006.01)

(52) U.S. Cl.
CPC .......... *H04L 9/0819* (2013.01); *H04L 9/3297* (2013.01)

(58) Field of Classification Search
CPC ............................ H04L 9/0819; H04L 9/3297
See application file for complete search history.

(56) References Cited

U.S. PATENT DOCUMENTS

| | | | | |
|---|---|---|---|---|
| 12,236,202 | B1 * | 2/2025 | DeWeese | ................ G06F 40/30 |
| 12,322,402 | B2 * | 6/2025 | Drolet | ................... G10L 19/018 |
| 2013/0004033 | A1 * | 1/2013 | Trugenberger | ......... G06F 21/32 |
| | | | | 382/125 |
| 2021/0319090 | A1 * | 10/2021 | Demir | .................. G06N 3/0475 |
| 2021/0319240 | A1 | 10/2021 | Demir et al. | |
| 2024/0152544 | A1 | 5/2024 | Aykut et al. | |
| 2025/0209200 | A1 * | 6/2025 | Paes | .................... G06F 21/6245 |

OTHER PUBLICATIONS

Tang, Nan, et al. "VerifAI: verified generative AI." arXiv preprint arXiv:2307.02796 (2023). (Year: 2023).*
Tihanyi, Norbert, et al. "The formai dataset: Generative ai in software security through the lens of formal verification." Proceedings of the 19th International Conference on Predictive Models and Data Analytics in Software Engineering. 2023. (Year: 2023).*
Plevris Vagelis et al: "Chatbots Put to the Test in Math and Logic Problems: A Comparison and Assessment of ChatGPT-3.5, ChatGPT-4, and Google Bard", Predictive Society and Data Analytics Lab, Faculty of Information Technology and Communication Sciences, Tampere University, 33100 Tampere, Finland, [Online] vol. 4, No. 4, Oct. 24, 2023 (Oct. 24, 2023), pp. 949-969, XP093315801.
Yepeng Liu et al: "Adaptive Text Watermark for Large Language Models", arxiv.org, Cornell University Library, 201 Olin Library Cornell University Ithaca, NY 14853, Jun. 9, 2024 (Jun. 9, 2024), XP091781486.

(Continued)

*Primary Examiner* — Shawnchoy Rahman
(74) *Attorney, Agent, or Firm* — XSENSUS LLP

(57) ABSTRACT

In some implementations, a system may receive an authentication key associated with authenticating use of a generative AI model. The system may receive an input prompt. The system may generate, using the generative AI model, an output based on the input prompt. The authentication key is embedded within the output. A quality of the output is higher when the authentication key is valid than when the authentication key is not valid.

20 Claims, 14 Drawing Sheets

(56)          References Cited

OTHER PUBLICATIONS

Wenjie Qu et al: "Provably Robust Muiti-bit Watermarking for AI-generated Text via Error Correction Code", arxiv.org, Cornell University Library, 201 Olin Library Cornell University Ithaca, NY 14853, Apr. 16, 2024 (Apr. 16, 2024), XP091728926.

Kiyoon Yoo et al: "Advancing Beyond Identification: Multi-bit Watermark for Large Language Models", arxiv.org, Cornell University Library, 201 Olin Library Cornell University Ithaca, NY 14853, Sep, 27, 2023 (Sep. 27, 2023), XP091623192.

* cited by examiner

User Identification: WGVK-1AB2-C3D4

Model Identification: Gen AI Model 1

Text Prompt: Generate an image of a gear

Time and Date of Generation: 8:05 pm (EST)/25-12-2024

130
Process the output

106
Server Device

125
Obtain the output

104
User Device

100

100

215

Provide input information to the
pre-trained generative AI model

Please provide the following:

Text prompt: | Generate an image of a gear |

User-specific
Model Parameters:    M

Authentication Key:    K

| Generate output |

104
User Device

User Identification: WGVK-1AB2-C3D4

Model Identification: Gen AI Model 1

Text Prompt: Generate an image of a gear

Time and Date of Generation: 8:05 pm (EST)/25-12-2024

230
Process the output

106
Server Device

225
Obtain the output

104
User Device

100

610  Receive an authentication key

620  Receive an input prompt

630  Generate an output, based on the input prompt, including the authentication key embedded within the output and where a quality of the output is higher when the authentication key is valid than when the authentication key is not valid

600

KEY-BASED GENERATIVE ARTIFICIAL INTELLIGENCE MODEL CONTENT GENERATION

BACKGROUND

A generative artificial intelligence (AI) model is a type of AI system designed to generate new data that is similar to data that it was trained on. Unlike discriminative models, which classify input data into predefined categories or make predictions based on input features, generative AI models focus on learning an underlying probability distribution of the training data and then use that distribution to generate new samples.

Accordingly, generative AI models are often used in tasks such as image generation, text generation, and/or music composition, among other examples. Typical generative AI models utilize various techniques, including neural networks (e.g., generative adversarial network (GAN) models, variational autoencoder (VAE) models, and autoregressive models), to learn and simulate patterns, structures, and relationships present in the training data. Generative AI models have applications in creative arts, content generation, data augmentation, and synthetic data generation, among other examples.

SUMMARY

Some implementations described herein relate to a method for generating an output of a generative artificial intelligence (AI) model using an authentication key, the method comprising: receiving, by a device, an authentication key associated with authenticating use of the generative AI model; receiving, by a device, an input prompt; generating, by the device and using the generative AI model, an output based on the input prompt, wherein generating the output includes embedding the authentication key within the output, and wherein a quality of the output is higher when the authentication key is valid than when the authentication key is not valid.

Some implementations described herein relate to a system for generating an output of a generative artificial intelligence (AI) model using an authentication key, the system comprising: one or more memories; and one or more processors, communicably coupled to the one or more memories, configured to: receive an authentication key associated with authenticating use of the generative AI model; receive an input prompt; generate, using the generative AI model, an output based on the input prompt, wherein generating the output includes embedding the authentication key within the output, and wherein a quality of the output is higher when the authentication key is valid than when the authentication key is not valid.

Some implementations described herein relate to a method for generating an output of a generative artificial intelligence (AI) model using an authentication key, the method comprising: receiving, by a device, an authentication key; authenticating, by the device and based on the authentication key, use of the generative AI model by a user prior to the user gaining access to the generative AI model; receiving, by a device, an input prompt; generating, by the device and using the generative AI model, an output based on the input prompt, wherein generating the output includes embedding the authentication key within the output, and wherein a quality of the output is higher when the authentication key is valid than when the authentication key is not valid.

Some implementations described herein related to a system for generating an output of a generative artificial intelligence (AI) model using an authentication key, the system comprising: one or more memories; and one or more processors, communicably coupled to the one or more memories, configured to: receive an authentication key; authenticate, based on the authentication key, use of the generative AI model by a user prior to the user gaining access to the generative AI model; receive an input prompt; generate, using the generative AI model, an output based on the input prompt, wherein generating the output includes embedding the authentication key within the output, and wherein a quality of the output is higher when the authentication key is valid than when the authentication key is not valid.

DETAILED DESCRIPTION OF EXAMPLE EMBODIMENTS

Figure 1A:
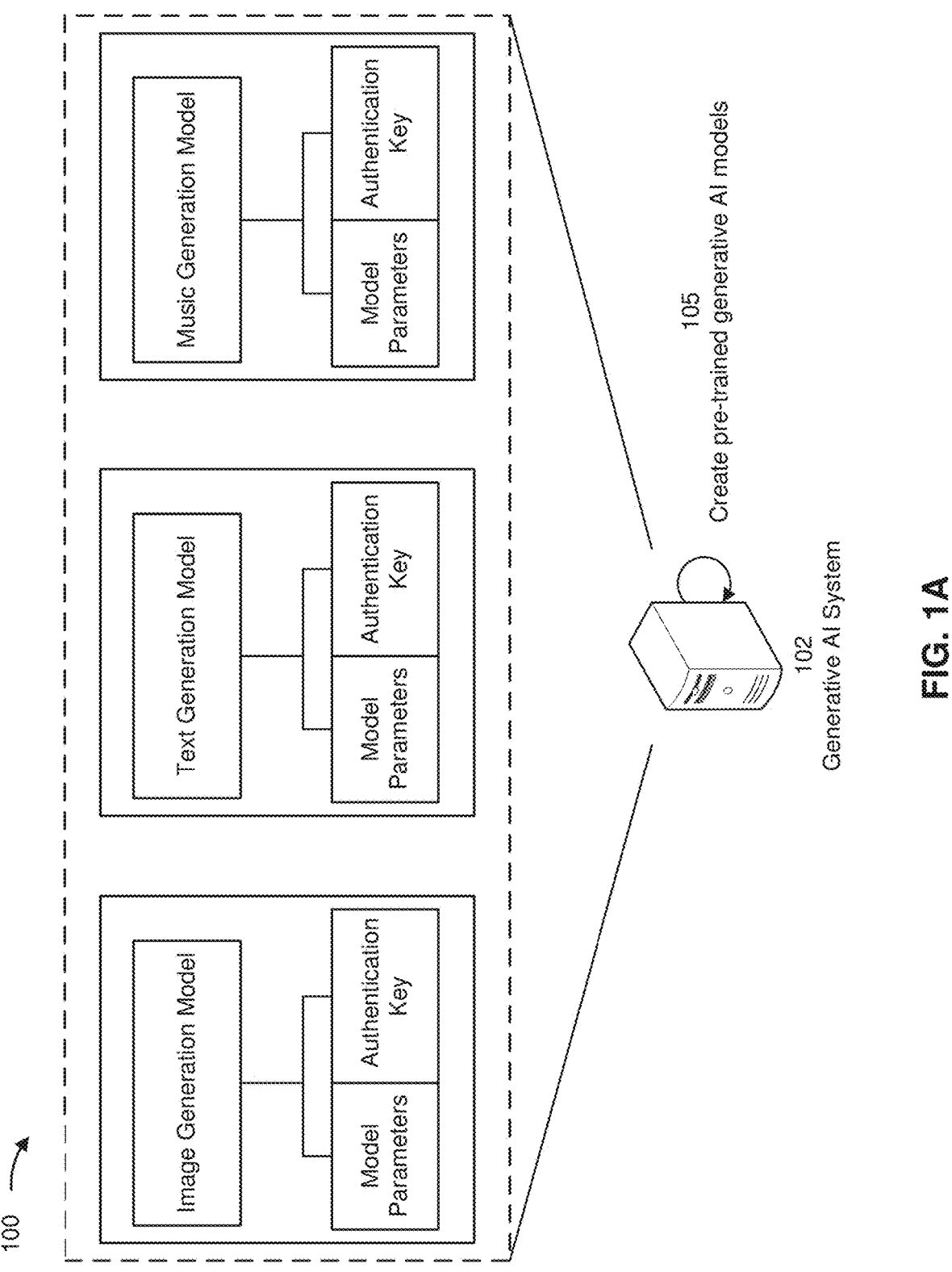
FIGS. 1A-1E are diagrams of an example implementation described herein.

The following detailed description of example implementations refers to the accompanying drawings. The same reference numbers in different drawings may identify the same or similar elements.

Generative artificial intelligence (AI) models have revolutionized fields, such as image generation, text synthesis, and music composition, by enabling machines to create content that closely resembles human-generated outputs. These models use techniques (e.g., neural network techniques and/or deep learning techniques) to learn patterns from vast datasets and can generate new, realistic-looking outputs autonomously. However, authentication and attribution associated with generative AI models present challenges.

Unlike traditional digital content, which often carries metadata or traces that facilitate tracking, generative AI outputs lack such identifiers, making it difficult to attribute content to its creator or originator. This anonymity complicates efforts to enforce intellectual property rights, prevent misuse, or verify the authenticity of generated content. Additionally, distinguishing between synthetically generated content and real data has become a pressing concern, particularly with the rise of deepfake technology, where generative AI can convincingly alter images and videos to depict events that never occurred.

Some implementations described herein provide key-based generative AI model content generation. For example, the systems and methods described herein may be used for generating an output of a generative AI model using an authentication key. As an example, a generative AI system may receive an authentication key associated with authenticating use of the generative AI model. The generative AI system may receive an input prompt. The generative AI system may generate, using a generative AI model, an output based on the input prompt. The generative AI system may embed the authentication key within the output. The generative AI system may generate the output such that a quality of the output is higher when the authentication key is valid than when the authentication key is not valid. Accordingly, for example, the generative AI system may authenticate use of a generative AI model (e.g., after a user gains access to the generative AI model, during use of the generative AI model, and/or before gaining access to the generative AI model, among other examples) and provide an output based on whether an authentication key (e.g., received by the generative AI model) is valid or is not valid, as described in more detail elsewhere herein.

Additionally, or alternatively, the generative AI system may embed metadata and/or other information (e.g., authentication information, provenance information and/or attribution information, among other examples) within the output. The output may be decoded (e.g., via a message decoder and/or a watermark decoder, among other examples) to extract information, such as the authentication key and/or the metadata, among other examples (e.g., which may be used to learn information associated with use of the generative AI model, among other examples).

In some other implementations, the generative AI system may generate user-specific generative AI models (e.g., user-specific pre-trained generative AI models) which encode user-specific attributes (e.g., an authentication key, metadata, provenance information, and/or attribution information, among other examples) within outputs generated by the user-specific generative AI models. The user-specific attributes may be extracted from the output, which may be used for various purposes (e.g., to learn information associated with use of the generative AI model, among other examples, among other examples). In this way, base model parameters of a single pretrained generative AI model may be modified on a per-user basis to create user-specific pretrained generative AI models which may be provided to the users for local use by the users. This reduces a need for substantial computing resources and storage requirements which would be required to train and store multiple user-specific generative AI models.

FIGS. 1A-1E are diagrams of an example implementation 100 associated with key-based generative AI model content generation. As shown in FIGS. 1A-1E, the example implementation 100 includes a generative AI system 102, a user device 104, and a server device 106. These devices are described in more detail below in connection with FIG. 4 and FIG. 5. The generative AI system 102, the user device 104, and the server device 106 may be connected via a network, such as a wired network (e.g., the Internet or another data network) and/or a wireless network (e.g., a wireless local area network, a wireless wide area network, and/or a cellular network, among other examples).

As shown in FIG. 1A, and by reference number 105, the generative AI system 102 creates pre-trained generative AI models (e.g., shown as a pre-trained generative AI model for image generation, a pre-trained generative AI model for text generation, and a pre-trained generative AI model for music generation in FIG. 1A). Architectures, model parameters, and/or weight initialization techniques, among other examples, may vary across the different domains (e.g., the image generation domain, the text generation domain, and the music generation domain, among other examples). Each domain presents unique challenges and characteristics that influence the design and implementation of the pre-trained generative AI models.

For example, in image generation, architectures often employ deep convolutional networks, such as generative adversarial networks (GANs) or variational autoencoders (VAEs). These architectures rely heavily on convolutional layers for spatial feature extraction and deconvolutional layers for upscaling the generated images. Model parameters, such as kernel sizes, number of filters, and layer depths are tailored to detect visual details and structures.

In contrast, text generation models typically utilize architectures, such as transformers or long short-term memory (LSTM) networks. These models are designed to handle sequential data and capture dependencies between words or tokens in text sequences. Model parameters include, for example, a number of layers in a transformer encoder-decoder stack, attention mechanisms for capturing context, and embedding dimensions that represent words or sub-word units.

Similarly, music generation models employ architectures that can model temporal dependencies effectively, such as LSTM networks or transformer architectures designed for sequential data. Model parameters in this domain focus on representing musical elements (e.g., notes, chords, rhythms) over time, with initialization techniques ensuring that the model learns meaningful patterns and structures in musical compositions.

Furthermore, weight initialization strategies are tailored to the specific characteristics of each domain. For example, initializing convolutional network weights in image generation models considers a spatial nature of images, whereas initializing LSTM weights in text or music generation models accounts for sequential dependencies.

In other words, specific architectures, model parameters, and weight initialization techniques may be tailored to characteristics and requirements of each domain, influencing how the pre-trained generative AI models are designed and implemented (e.g., to create realistic and coherent outputs across the different domains).

Although the generative AI system 102 is described as creating the pre-trained generative AI model for image generation, the pre-trained generative AI model for text generation, and the pre-trained generative AI model for music generation, the generative AI system may 102 create any suitable pre-trained generative AI model having any suitable architectures, model parameters, and/or weight initialization techniques and/or may create generative AI models that are not pre-trained generative AI models (e.g., trainable generative AI models, among other examples). Furthermore, the pre-trained generative AI models may include any suitable number of generative AI networks, such as teacher generators and/or trainable generators, among other examples. In some implementations, the generative AI system 102 may generate an output using an authentication key, as described in more detail elsewhere herein.

Figure 1B:
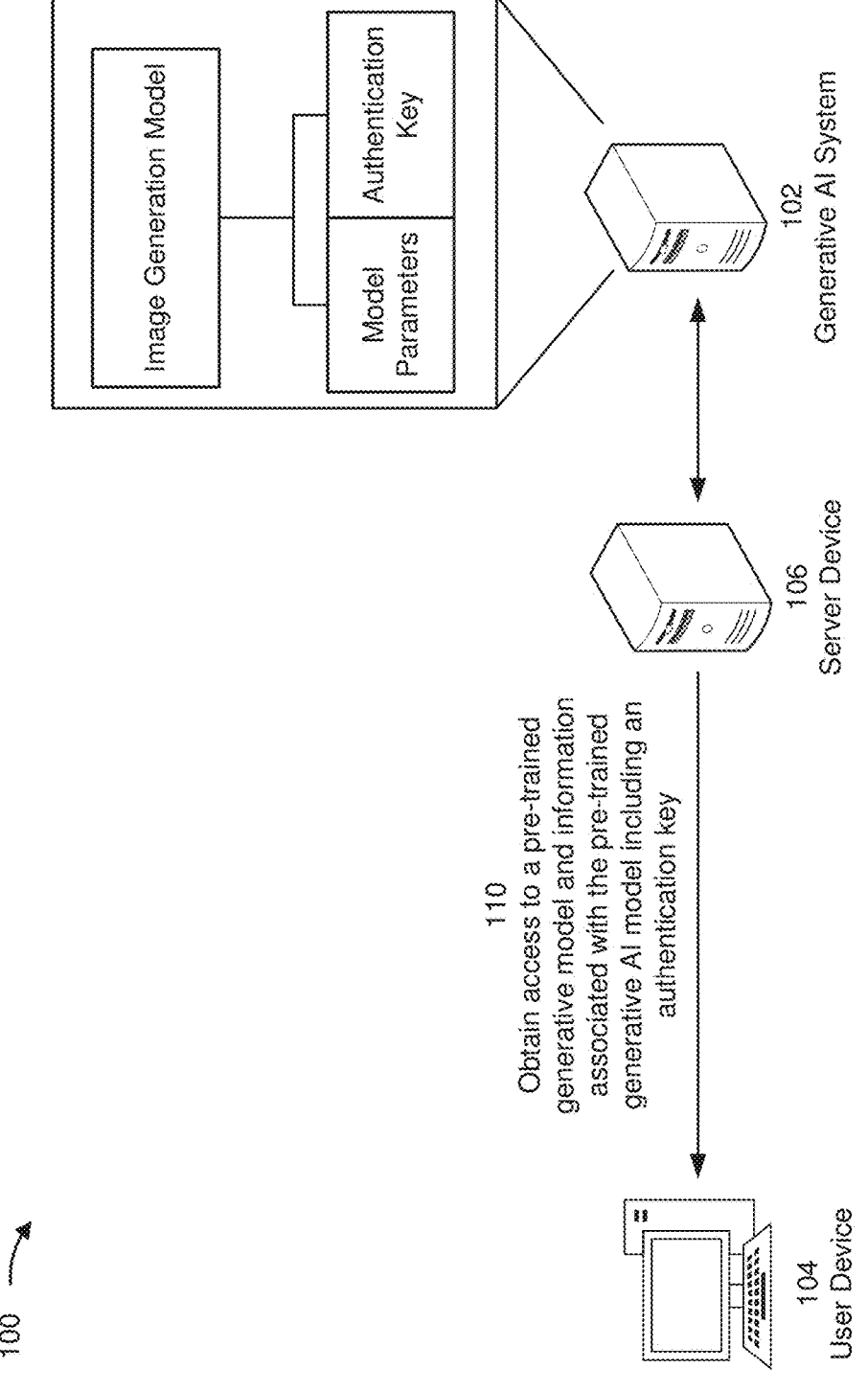

As shown in FIG. 1B, and by reference number 110, a user may obtain access to a pre-trained generative AI model and information associated with the pre-trained generative AI model including an authentication key. In some implementations, the server device 106 may host the pre-trained generative AI model, and the user device 104 may access a platform or service where the pre-trained generative AI model is available for download (e.g., a website, an application marketplace, and/or a dedicated generative AI model repository, among other examples).

As an example, a user of the user device 104 may navigate to the platform or service and select the desired pre-trained generative AI model for download (e.g., the user may click a download button or follow installation instructions provided by the service, among other examples). After downloading the pre-trained generative AI model, the user may cause the pre-trained generative AI model to be deployed on the user device 104 (e.g., based on the model parameters). After installation, the user may access the pre-trained generative AI model (e.g., via a user interface of the user device 104 that is part of an application or software tool designed in association with the pre-trained generative AI model, among other examples).

In some implementations, the server device 106 may host the pre-trained generative AI model, and the user device 104 may access a platform or service where the pre-trained generative AI model is available for utilization (e.g., via an application programming interface (API) endpoint, a web service, or a dedicated generative AI model hosting platform, among other examples). As an example, a user of the user device 104 may navigate to the platform or service and interact with the hosted pre-trained generative AI model (e.g., by sending requests through API calls or accessing a web interface). In this way, the user may utilize the pre-trained generative AI model without downloading the pre-trained generative AI model directly. The server-side hosted pre-trained generative AI model handles processing and generation tasks, providing outputs based on inputs (e.g., input prompts) and/or requests of the user.

In some implementations, the generative AI system 102 may provide, and the user device 104 may receive, an authentication key. The authentication key may be uniquely associated with the generative AI system 102, the user device 104, the pre-trained generative AI model, and/or the user that utilizes the user device 104 to access and/or use the pre-trained generative AI model, such as by providing one or more input prompts to the pre-trained generative model to cause the pre-trained generative model to generate one or more outputs based on the one or more input prompts. In this way, the authentication key may be used to authenticate use of the pre-trained generative AI model (e.g., after gaining access to the pre-trained generative AI model), as described in more detail elsewhere herein.

Figure 1C:
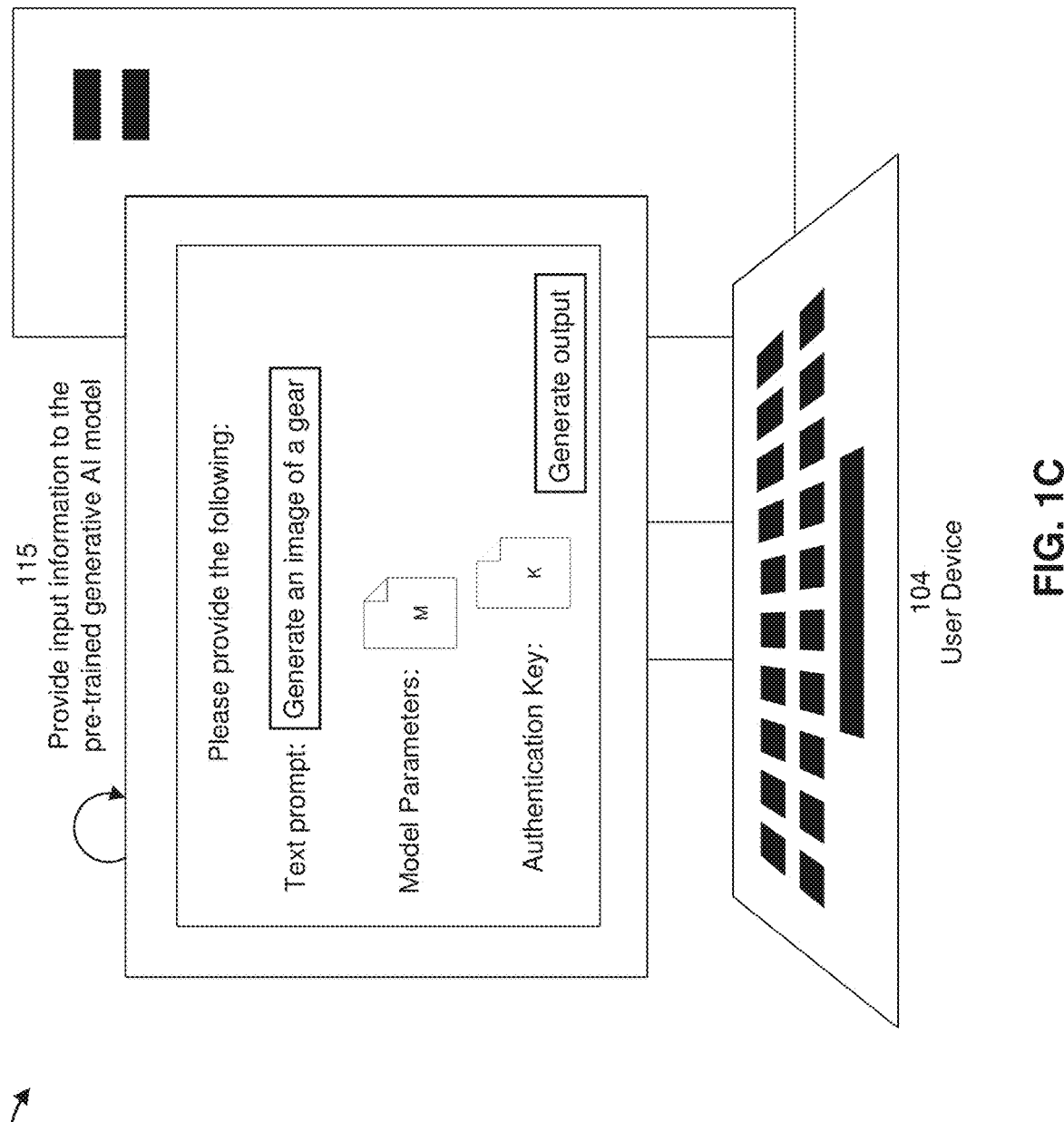

As shown in FIG. 1C, and by reference number 115, the user may provide (e.g., via the user device 104) input information to the pre-trained generative AI model. As an example, the user may provide one or more input prompts (e.g., one or more text prompts, one or more image prompts, one or more audio prompts, one or more video prompts, one or more document prompts, one or more code prompts, one or more multimodal prompts, one or more structured data prompts, and/or one or more interactive prompts, among other examples).

As further shown in FIG. 1C, the user provides, via user device 104, a text prompt of generate an image of a gear, the model parameters associated with the image generation model, and an authentication key (e.g., the authentication key provided to the user after the user gains access to the pre-trained generative AI model).

In some implementations, the image generation model may use the authentication key for authentication and/or attribution purposes (e.g., because the authentication key is uniquely associated with the user, the generative AI system 102, the user device 104, and/or the pre-trained generative AI model). As an example, the image generation model may use the authentication key for user authentication (e.g., to verify an identity of the user accessing and/or otherwise using the image generation model), image generation model authentication (e.g., to confirm that the image generation model is genuine and has not been altered), output authentication (e.g., to ensure that the output of the image generation model is authentic), user session authentication (e.g., to verify that each interaction with the image generation model occurs within an authenticated session), user attribution (e.g., to identify the user proving an input prompt for the image generation model), input attribution (e.g., to track information associated with input data fed to the image generation model), and/or output attribution (e.g., to identify the image generation model as a source of the output), among other examples.

In some implementations, the pre-trained generative AI model may embed the authentication key within the output. In this way, one or more extraction techniques (e.g., one or more decoding techniques) may be used to extract the authentication key from the output for further processing, as described in more detail elsewhere herein.

Figure 1D:
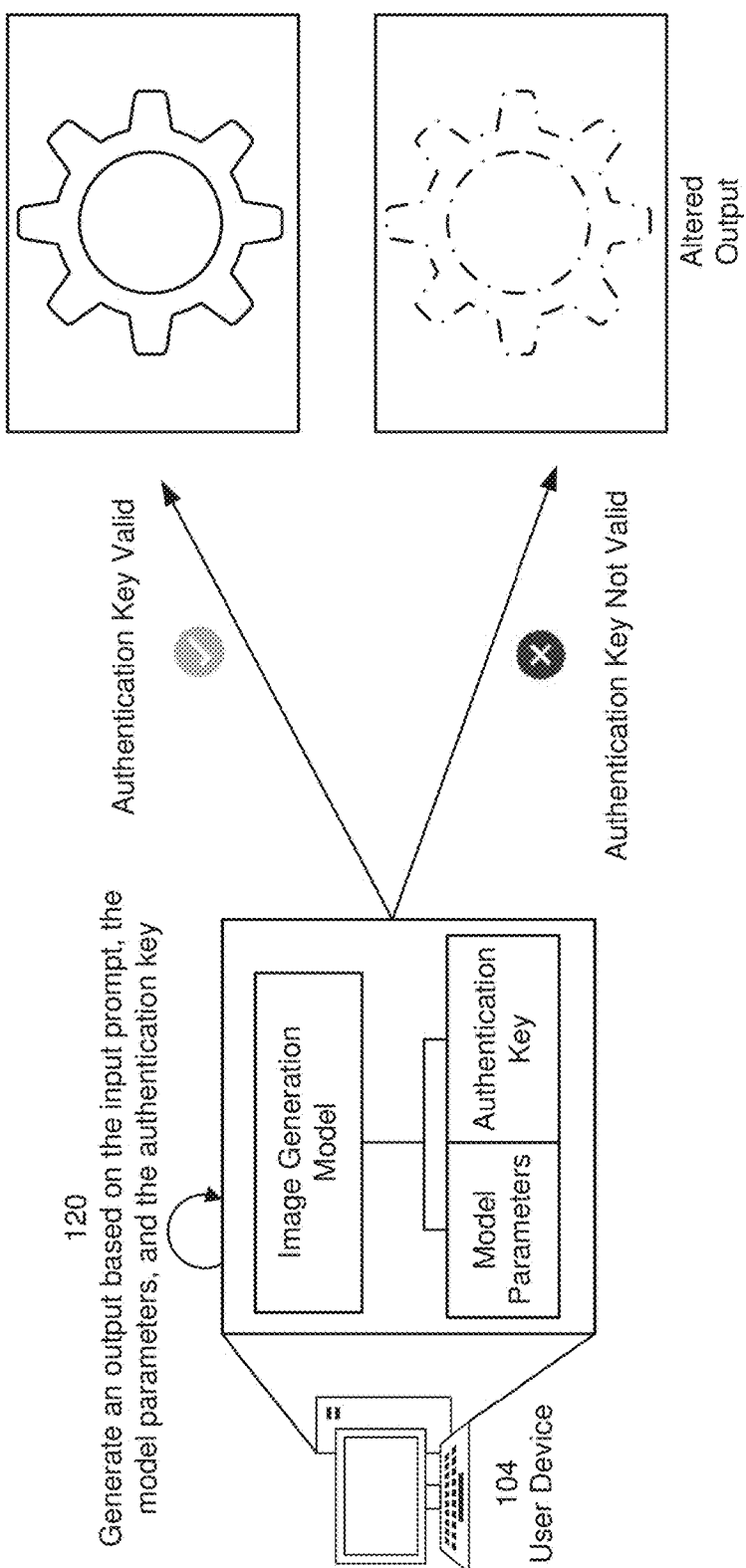

As shown in FIG. 1D, and by reference number 120, the image generation model may generate (e.g., in response to the user pressing the "generate output" button as shown in FIG. 1D) an output (e.g., shown as an image of a gear in FIG. 1D) based on the input prompt (e.g., shown as the text prompt of generate an image of a gear in FIG. 1D), the model parameters (e.g., shown as model parameters in FIG. 1D), and the authentication key (e.g., shown as authentication key in FIG. 1D). In some implementations, a quality of the output is higher when the authentication key is valid than when the authentication key is not valid. As an example, and as shown in FIG. 1D, the image generation model may provide the higher-quality version of the image of the gear when the authentication key is valid or may provide the lower-quality version of the image of the gear when the authentication key is not valid. In other words, the image generation model may alter the higher-quality version of the image of the gear to generate the lower-quality version of the gear based on the authentication key being not valid, as described in more detail elsewhere herein.

In some implementations, the pre-trained generative AI model may alter the output when the authentication key is not valid. In other words, the pre-trained generative AI model may cause a quality of the output to be reduced when the authentication key is not valid. Although the pre-trained generative AI model is described herein as providing an output with lower quality when the authentication key is not valid than when the authentication key is valid (e.g., by reducing the quality of the output before providing the output for display to the user), the pre-trained generative AI model may generate any suitable output when the authentication key is not valid, such as a null output and/or an unintelligible output, among other examples. In this way, the pre-trained generative AI model may generate a coherent output when the authentication key is valid and a noncoherent output when the authentication key is not valid.

Figure 1E:
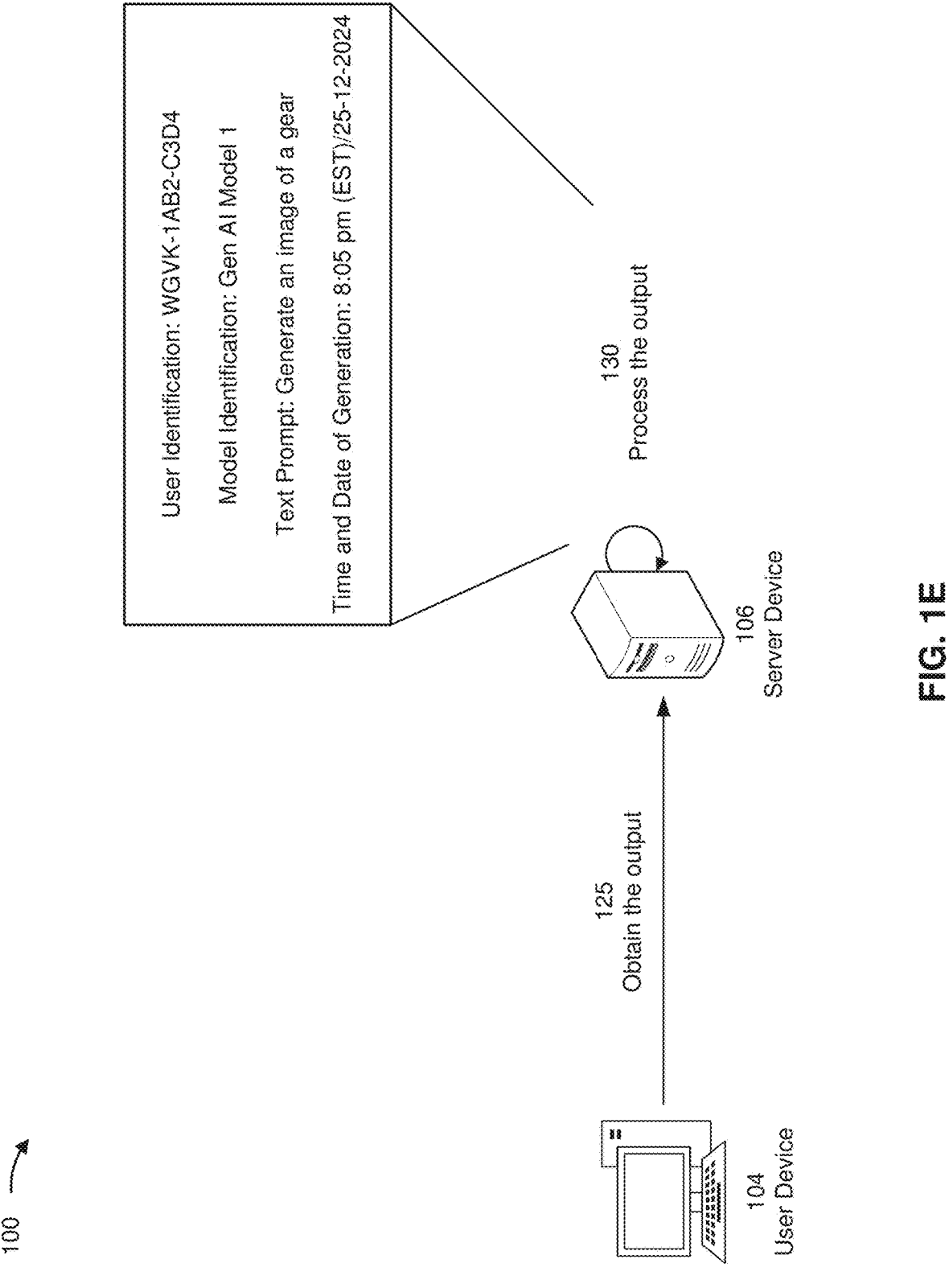

As shown in FIG. 1E, and by reference number 125, the server device 106 may obtain the output (e.g., generated by the pre-trained generative AI model). For example, the user device 104 may send, and the server device 106 may receive, the output. As an example, the user device 104 may automatically send the output (e.g., created by the pre-trained generative AI model) to the server device 106 based on the output being created. Although the output is described as being sent to the server device 106 via the user device 104, the server device 106 may obtain the generated output in any suitable manner. For example, the server device 106 may obtain the output by detecting the output (e.g., if the output is publicly published on the Internet, among other examples).

As further shown in FIG. 1E, and by reference number 130, the server device 106 may process the output. In some implementations, the server device 106 may process (e.g., via a decoder, among other examples) the output to extract information from the output (e.g., information associated with the generative AI system 102, the user device 104, the user of the user device 104, and/or the pre-trained generative AI model, among other examples, as described in more detail elsewhere herein). As further shown in FIG. 1E, the information extracted from the output includes user identification information, model identification information (e.g., a model name and/or a model version, among other examples), text prompt information and time and date of generation information (e.g., a date and time of generation of the output, and/or a timestamp associated with the output, among other examples). In this way, the systems and methods described herein may be used to identify users of pre-trained generative AI models and/or may be used to identify whether content is synthetically generated (e.g., by a pre-trained generative AI model) or is not synthetically generated, among other examples.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple distributed devices. Additionally, or alternatively, a set of devices (e.g., one or more devices) shown in FIGS. 1A-1E may perform one or more functions described as being performed by another set of devices shown in FIGS. 1A-1E.

FIGS. 2A-2E are diagrams of an example implementation 200 associated with key-based generative AI model content generation. As shown in FIGS. 2A-2E, the example implementation 200 includes the generative AI system 102, the user device 104, and the server device 106. These devices are described in more detail below in connection with FIG. 4 and FIG. 4. The user device 104 and the server device 106 may be connected via a network, such as a wired network (e.g., the Internet or another data network) and/or a wireless network (e.g., a wireless local area network, a wireless wide area network, and/or a cellular network, among other examples.

Figure 2A:
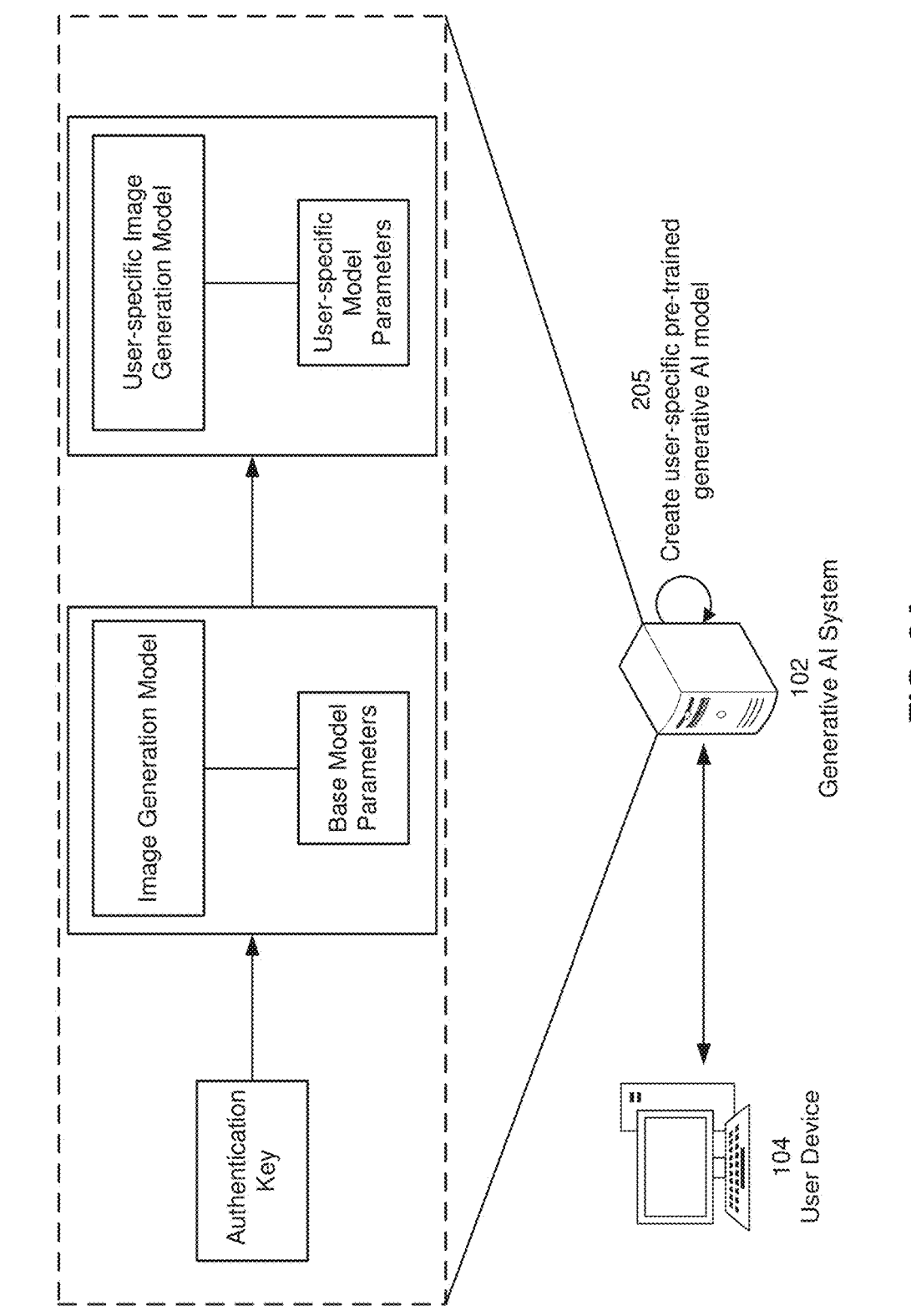
FIGS. 2A-2E are diagrams of an example implementation described herein.

As shown in FIG. 2A, and by reference number 205, the generative AI system 102 may create a user-specific pre-trained generative AI model. In some implementations, the generative AI system 102 may modify one or more parameters of a generative AI model (e.g., one or more base model parameters of the generative AI model) to create a user-specific pre-trained generative AI model that embeds an authentication key (e.g., an authentication key that is uniquely associated with a future user of the user-specific pre-trained generative AI model and the user-specific pre-trained generative AI model) within outputs generated by the user-specific pre-trained generative AI model. In this way, one or more extraction techniques (e.g., one or more decoding techniques) may be used to extract the authentication key from the output. Although the user-specific pre-trained generative AI model is trained to modify one or more base model parameters and embed the authentication key within the outputs generated by the user-specific generative AI model, the user-specific pre-trained generative AI model may be modified in any suitable manner and may embed any suitable information within the outputs generated by the user-specific generative AI model (e.g., metadata, provenance information, and/or attribution information, among other examples).

Figure 2B:
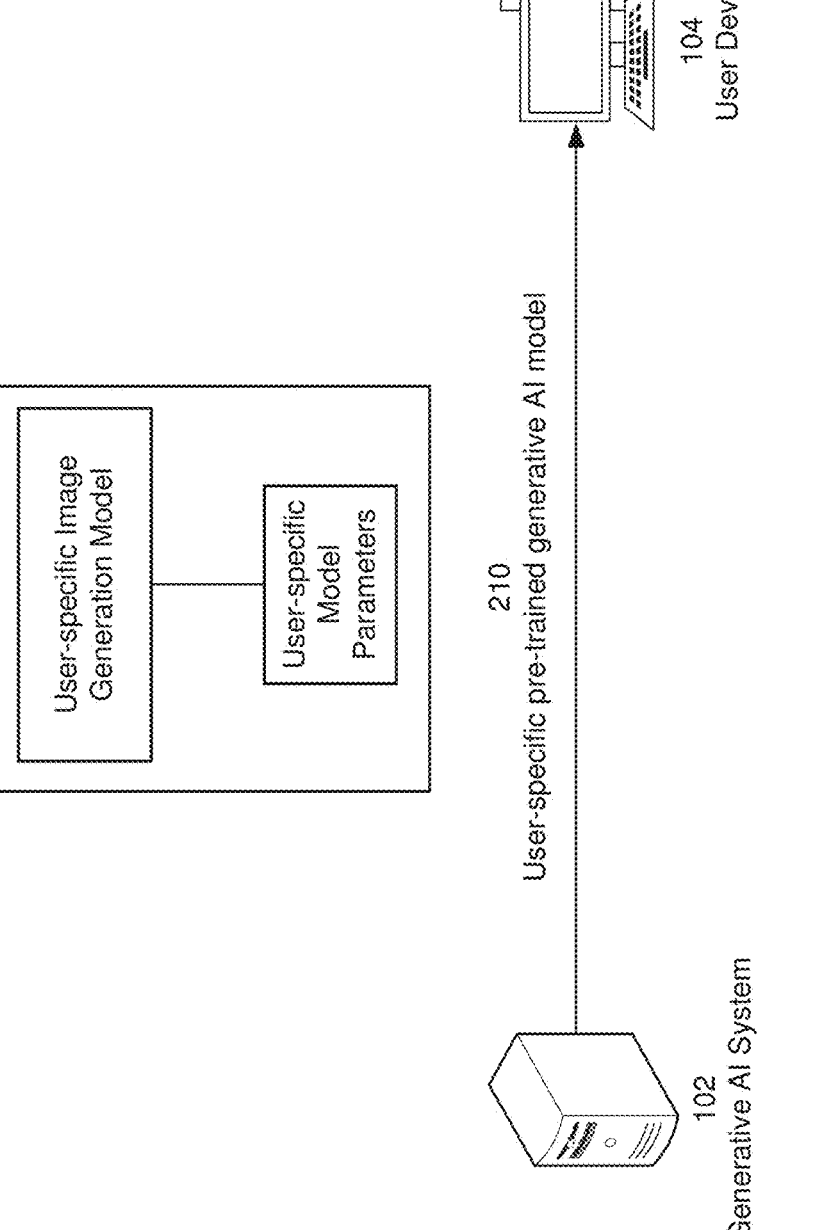

As shown in FIG. 2B, the generative AI system 102 may provide, and the user device 104 may receive, the user-specific pre-trained generative AI model (e.g., shown as the user-specific image generation model in FIG. 2B). As an example, the user device 104 download the user-specific pre-trained generative AI model, as described in more detail elsewhere herein.

Figure 2C:
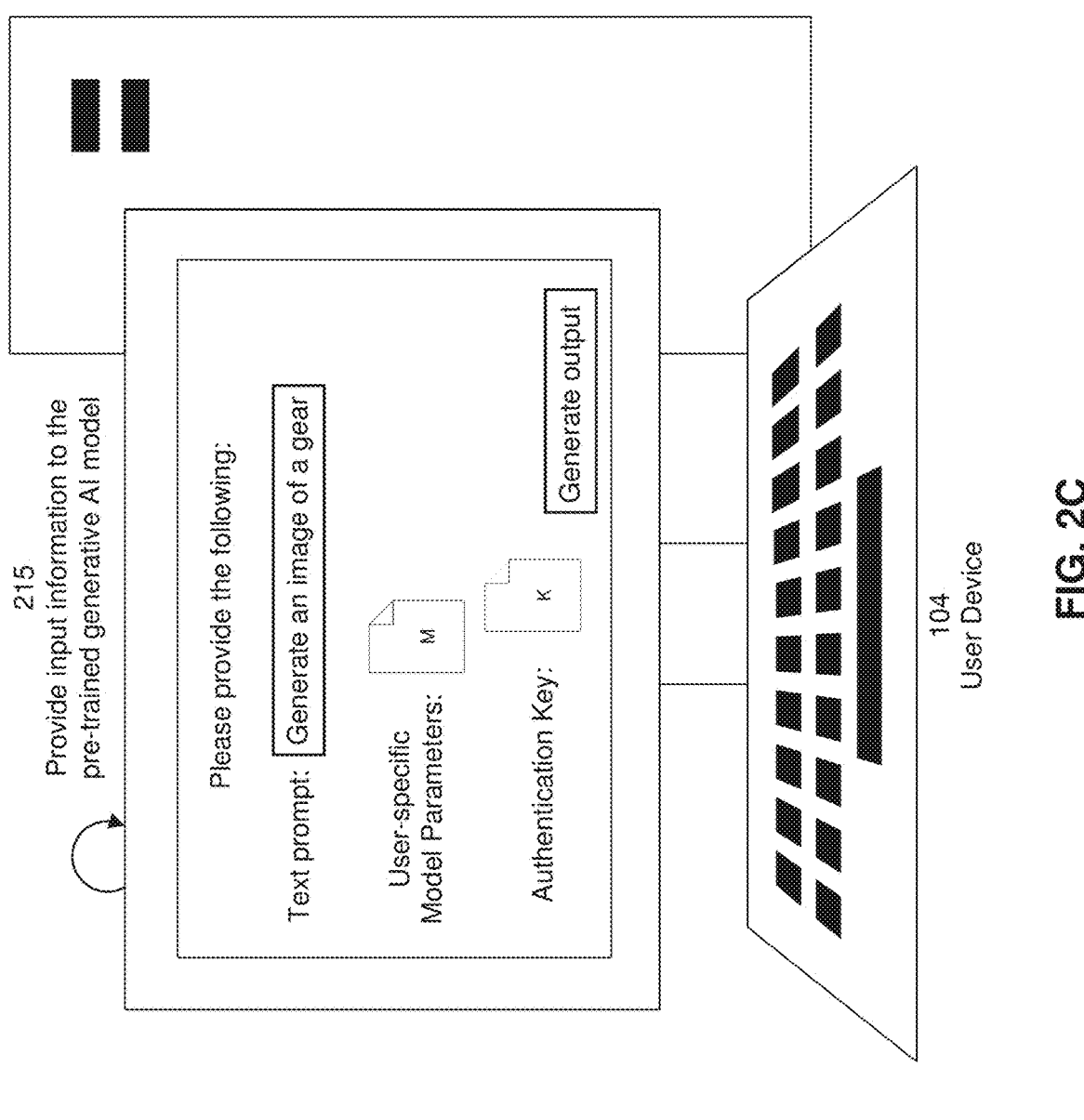

As shown in FIG. 2C, and by reference number 215, the user may provide (e.g., via the user device 104) input information to the user-specific pre-trained generative AI model, as described in more detail elsewhere herein. As further shown in FIG. 2C, the user provides a text prompt of generate an image of a gear, user-specific model parameters, and the authentication key.

Figure 2D:
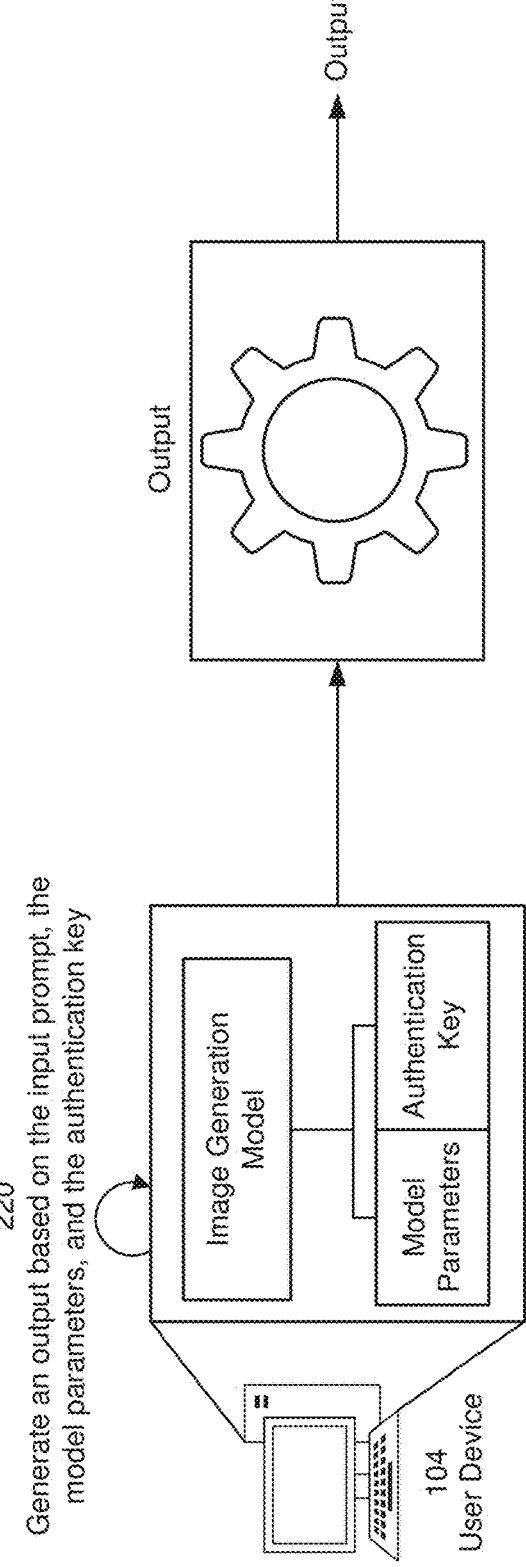

As further shown in FIG. 2C, the user provides, via the user device 104, a text prompt of generate an image of a gear, the user-specific model parameters associated with the image generation model, and an authentication key (e.g., the authentication key provided to the user before the user gains access to the pre-trained generative AI model). As shown in FIG. 2D, and by reference number 220, the user-specific image generation model may generate (e.g., in response to the user pressing the "generate output" button as shown in FIG. 2D) an output (e.g., shown as an image of a gear in FIG. 2D) based on the input prompt (e.g., shown as the text prompt of generate an image of a gear in FIG. 2D), the user-specific model parameters (e.g., shown as user specific model parameters in FIG. 2D), and the authentication key (e.g., shown as authentication key in FIG. 2D).

Figure 2E:
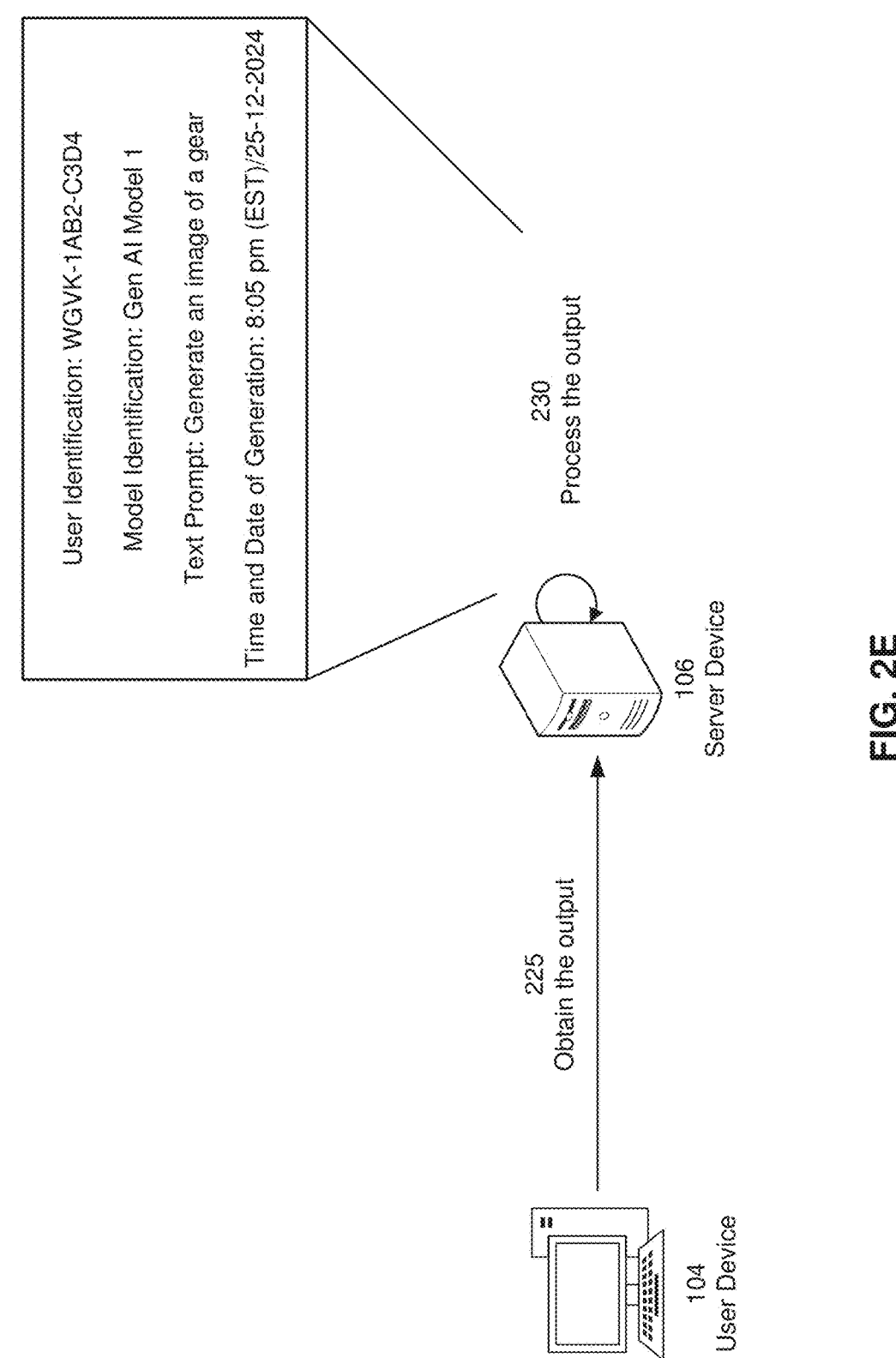

As shown in FIG. 2E, and by reference number 225, the server device 106 may obtain the output (e.g., generated by the user-specific image generation model). For example, the user device 104 may send, and the server device 106 may receive, the output. As an example, the user device 104 may automatically send the output (e.g., created by the pre-trained generative AI model) to the server device 106 based on the output being created. Although the output is described as being sent to the server device 106 via the user device 104, the server device 106 may obtain the generated output in any suitable manner. For example, the server device 106 may obtain the output by detecting the output (e.g., if the output is publicly published on the Internet, among other examples).

As further shown in FIG. 2E, and by reference number 230, the server device 106 may process the output. In some implementations, the server device 106 may process (e.g., via a decoder, among other examples) the output to extract information from the output (e.g., information associated with the generative AI system 102, user device 104, the user of the user device 104, and/or the user-specific pre-trained generative AI model, and/or outputs created by the user-specific pre-trained generative AI model, among other examples, as described in more detail elsewhere herein).

As further shown in FIG. 2E, the information extracted from the output includes user identification information, model identification information, text prompt information and time and date of generation information (e.g., a date and time of generation of the output). In this way, the systems and methods described herein may be used to create user-specific pretrained generative AI models, enabling tracking of information associated with the user-specific pre-trained generative AI models (e.g., provenance information, attribution information, among other examples).

As indicated above, FIGS. 2A-2E are provided as an example. Other examples may differ from what is described with regard to FIGS. 2A-2E. The number and arrangement of devices shown in FIGS. 2A-2E are provided as an example. In practice, there may be additional devices, fewer devices, different devices, or differently arranged devices than those shown in FIGS. 2A-2E. Furthermore, two or more devices shown in FIGS. 2A-2E may be implemented within a single device, or a single device shown in FIGS. 2A-2E may be implemented as multiple distributed devices. Additionally, or alternatively, a set of devices (e.g., one or more devices) shown in FIGS. 2A-2E may perform one or more functions described as being performed by another set of devices shown in FIGS. 2A-2E.

Accordingly, some implementations described herein enable key-based generative AI model content generation. For example, some implementations described herein use an authentication key to authenticate use of a generative AI model. The authentication key may be uniquely associated with a user and a generative AI model (e.g., a pre-trained generative AI model). The authentication key may be provided to a user (e.g., after the user gains access to the generative AI model). The user may provide the authentication key as an input to the generative AI model to authenticate use of the generative AI model by the user.

The generative AI model may generate an output based on an input prompt (e.g., provided by the user). The generative AI model may determine whether to modify the out based on the authentication key being not valid. As an example, the generative AI model may modify the output to create an altered output with a decreased quality relative to a quality of the output. The generative AI model may embed the authentication key, and/or other information (e.g., metadata, provenance information, and/or attribution information, among other examples), within the output, or within the altered output. The generative AI model may provide the output or the altered output to the user. The authentication key, and/or the other information, may be extracted from the output, or the altered output, which may be used for tracking information associated with use of the generative AI model, among other examples.

Additionally, or alternatively, some implementations described herein generate user-specific generative AI models (e.g., user-specific pre-trained generative AI models) which encode user-specific attributes (e.g., an authentication key, metadata, provenance information, and/or attribution information, among other examples) within outputs generated by the user-specific generative AI models. The user-specific attributes may be extracted from the output, which may be used for tracking information associated with use of the user-specific generative AI model, among other examples. In this way, base model parameters of a single pretrained generative AI model may be modified on a per-user basis to create user-specific pretrained generative AI models which may be provided to the users for local use by the users. This reduces a need for substantial computing resources and storage requirements which would be required to train and store multiple user-specific generative AI models.

Figure 3:
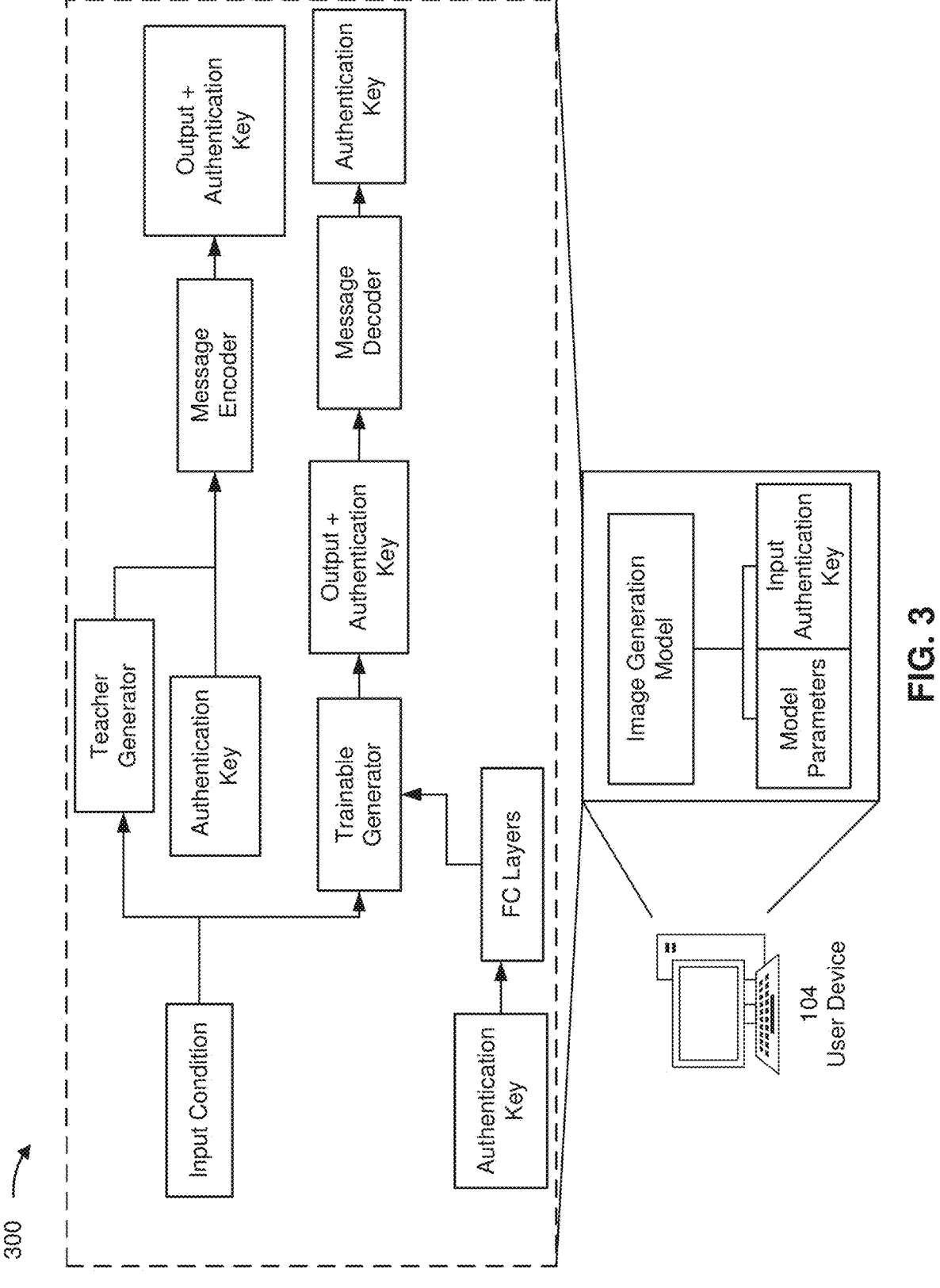
FIG. 3 is a diagram of an example generative artificial intelligence model described herein.

FIG. 3 is a diagram of an example generative AI model 300 described herein. In some implementations, the generative AI model 300 may include one or more generators (e.g., one or more pre-trained teacher generators and/or one or more or trainable generators), one or more encoders (e.g., one or more message encoders), one or more decoders (e.g., one or more message decoders), and/or one or more sets of fully connected (FC) layers, among other examples.

For example, and as shown in FIG. 3, the generative AI model 300 includes a teacher generator (e.g., a pre-trained generator), a message encoder, FC layers, a trainable generator, and a message decoder. In some implementations, an input condition is fed to the teacher generator and the trainable generator. The teacher generator creates, based on the input condition, a target output (e.g., a desired generated output, among other examples). The message encoder embeds an authentication key within the target output. The authentication key is fed to the trainable generator (e.g., through the FC layers) and the trainable generator creates, based on the input condition, a learned output where the authentication key is embedded within the learned output.

In some implementations, the generative AI model 300 may sample from a set of valid keys and a set of invalid keys. During training, the same authentication key is fed to the teacher generator and the trainable generator. During inference (e.g., on a user device local to a user), the authentication key is fed to the trainable generator.

In some implementations, the trainable generator may be finetuned (e.g., using a loss function, such as a mean squared error loss function) such that the learned output matches the target output. Additionally, or alternatively, another loss function (e.g., a cross-entropy loss function) may be applied to the output of the trainable generator (e.g., after being fed to a pre-trained message decoder with a reference being the conditioned key).

In some implementations, the generative AI model 300 may apply a reconstruction loss function that is dependent on whether the authentication key is valid or is not valid. As an example, the reconstruction loss function may be defined as Loss=G(Authentication key embedded within the target output, learned output)+H(authentication key extracted using the message decoder, authentication key)+A(learned output, altered target), where, if the authentication key is valid, A( . . . )=0, where, if the authentication key is not valid, G( . . . ) and H( . . . )=0, where G, H, and A are distance metrics (e.g., mean squared error loss and/or cross-entropy loss distances, among other examples), and where the altered target is an altered version of the target output (e.g., a degraded version of the target output, among other examples).

In this way, the generative AI model 300 may provide a coherent generated output only when the authentication key is determined to be valid. Additionally, or alternatively, the generative AI model 300 may embed other information within the generated outputs (e.g., metadata which identifies the user for the generation of coherent outputs, among other examples). In this way, following generation of an output (e.g., in the form of an image output, an audio output, a text output, a video output or movie, a multimodal output, and/or a synthetic content output, among other examples), a decoder (e.g., a message decoder and/or a watermark decoder, among other examples) may be used for the extraction of the authentication key, along with the metadata and/or other information, as described in more detail elsewhere herein.

In some implementations, the generative AI system 102 may generate user-specific generative AI models (e.g., user-specific pre-trained generative AI models) which encode user-specific attributes (e.g., an authentication key, metadata, provenance information, and/or attribution information, among other examples) within outputs generated by the user-specific generative AI models. The user-specific attributes may be extracted from the output, which may be used for various purposes (e.g., to learn information associated with use of the generative AI model, among other examples, among other examples).

In some implementations, to create the user-specific model parameters, an authentication key is fed into a trainable generator (e.g., the trainable generator of FIG. 3) and the base model parameters are modified into user-specific model parameters (e.g., which are then embedded within the outputs generate by the user-specific generative AI model. In this way, base model parameters of a single pretrained generative AI model may be modified on a per-user basis to create user-specific pretrained generative AI models which may be provided to the users for local use by the users.

Figure 4:
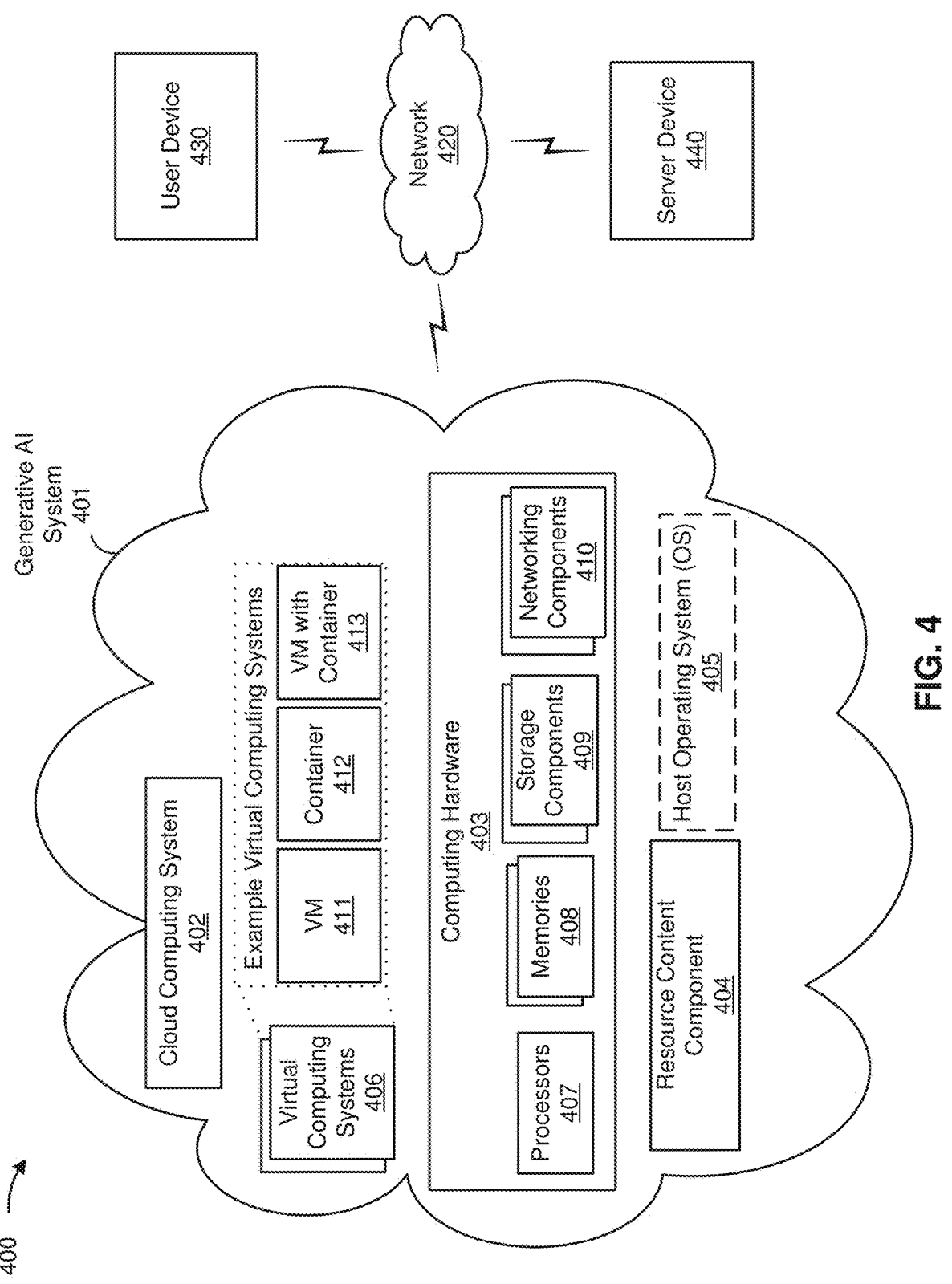
FIG. 4 is a diagram of an example environment in which systems and/or methods described herein may be implemented.

FIG. 4 is a diagram of an example environment 400 in which systems and/or methods described herein may be implemented. As shown in FIG. 4, the environment 400 includes a generative AI system 401, which may include one or more elements of and/or may execute within a cloud computing system 402. The cloud computing system 402 includes one or more elements 403-413, as described in more detail below. As further shown in FIG. 4, the environment 400 includes a network 420, a user device 430, and/or a server device 440. Devices and/or elements of the environment 400 may interconnect via wired connections and/or wireless connections.

The cloud computing system 402 includes computing hardware 403, a resource management component 404, a host operating system (OS) 405, and/or one or more virtual computing systems 406. The resource management component 404 may perform virtualization (e.g., abstraction) of the computing hardware 403 to create the one or more virtual computing systems 406. Using virtualization, the resource management component 404 enables a single computing device (e.g., a computer, a server, and/or the like) to operate like multiple computing devices, such as by creating multiple isolated virtual computing systems 406 from the computing hardware 403 of the single computing device. In this way, computing hardware 403 can operate more efficiently, with lower power consumption, higher reliability, higher availability, higher utilization, greater flexibility, and lower cost than using separate computing devices.

The computing hardware 403 includes hardware and corresponding resources from one or more computing devices. For example, computing hardware 403 may include hardware from a single computing device (e.g., a single server) or from multiple computing devices (e.g., multiple servers), such as multiple computing devices in one or more data centers. As shown, computing hardware 403 may include one or more processors 407, one or more memories 408, one or more storage components 409, and/or one or more networking components 410. Examples of a processor, a memory, a storage component, and a networking component (e.g., a communication component) are described elsewhere herein.

The resource management component 404 includes a virtualization application (e.g., executing on hardware, such as computing hardware 403) capable of virtualizing computing hardware 403 to start, stop, and/or manage one or more virtual computing systems 406. For example, the resource management component 404 may include a hypervisor (e.g., a bare-metal or Type 1 hypervisor, and/or a hosted or Type 2 hypervisor, among other examples) or a virtual machine monitor, such as when the virtual computing systems 406 are virtual machines 411. Additionally, or alternatively, the resource management component 404 may include a container manager, such as when the virtual computing systems 406 are containers 412. In some implementations, the resource management component 404 executes within and/or in coordination with a host operating system 405.

A virtual computing system 406 includes a virtual environment that enables cloud-based execution of operations and/or processes described herein using computing hardware 403. As shown, a virtual computing system 406 may include a virtual machine 411, a container 412, a hybrid environment 413 that includes a virtual machine and a container, among other examples. A virtual computing system 406 may execute one or more applications using a file system that includes binary files, software libraries, and/or other resources required to execute applications on a guest operating system (e.g., within the virtual computing system 406) or the host operating system 405.

Although the generative AI system 401 may include one or more elements 403-413 of the cloud computing system 402, may execute within the cloud computing system 402, and/or may be hosted within the cloud computing system 402, in some implementations, the generative AI system 401 may not be cloud-based (e.g., may be implemented outside of a cloud computing system) or may be partially cloud-based. For example, the generative AI system 401 may include one or more devices that are not part of the cloud computing system 402, such as the device 500 of FIG. 5, which may include a stand-alone server or another type of computing device. The generative AI system 401 may perform one or more operations and/or processes described in more detail elsewhere herein.

The network 420 includes one or more wired and/or wireless networks. For example, network 420 may include a cellular network, a public land mobile network (PLMN), a local area network (LAN), a wide area network (WAN), a private network, the Internet, among other examples, and/or a combination of these or other types of networks. The network 420 enables communication among the devices of environment 400.

The user device 430 includes one or more devices capable of receiving, generating, storing, processing, and/or providing information associated with enhanced AI model authentication to the generative AI system 401, as described elsewhere herein. The user device 430 may include a communication device and/or a computing device. For example, the user device 430 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The server device 440 includes one or more devices capable of receiving, generating, storing, processing, providing, and/or routing information associated with enhanced AI model authentication to the generative AI system 401, as described elsewhere herein. The server device 440 may include a communication device and/or a computing device. For example, the server device 440 may include a server, such as an application server, a client server, a web server, a database server, a host server, a proxy server, a virtual server (e.g., executing on computing hardware), or a server in a cloud computing system. In some implementations, the server device 440 includes computing hardware used in a cloud computing environment.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
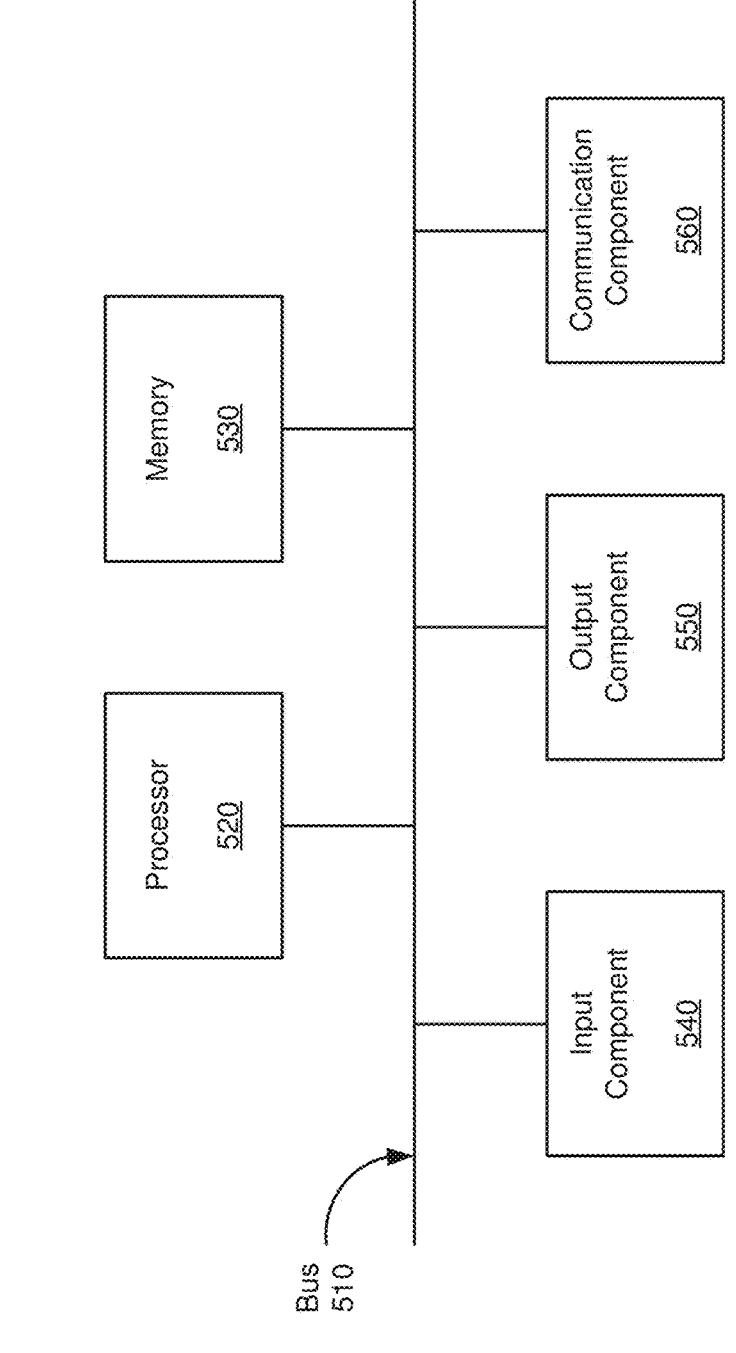
FIG. 5 is a diagram of example components of one or more devices of FIG. 4.

FIG. 5 is a diagram of example components of a device 500, which may correspond to the generative AI system 102, the user device 104, the server device 106, the generative AI system 401, the one or more elements 403-413, the user device 430, and/or the server device 440. In some implementations, the generative AI system 102, the user device 104, the server device 106, the generative AI system 401, the one or more elements 403-413, the user device 430, and/or the server device 440 may include one or more devices 500 and/or one or more components of the device 500. As shown in FIG. 5, the device 500 includes a bus 510, a processor 520, a memory 530, a storage component 540, an input component 550, an output component 560, and a communication component 570.

The bus 510 includes a component that enables wired and/or wireless communication among the components of the device 500. The processor 520 includes a central processing unit, a graphics processing unit, a microprocessor, a controller, a microcontroller, a digital signal processor, a field-programmable gate array, an application-specific integrated circuit, and/or another type of processing component. The processor 520 is implemented in hardware, firmware, or a combination of hardware and software. In some implementations, the processor 520 includes one or more processors capable of being programmed to perform a function. The Memory 530 includes a random-access memory, a read only memory, and/or another type of memory (e.g., a flash memory, a magnetic memory, and/or an optical memory).

The storage component 540 stores information and/or software related to the operation of the device 500. For example, the storage component 540 may include a hard disk drive, a magnetic disk drive, an optical disk drive, a solid-state disk drive, a compact disc, a digital versatile disc, and/or another type of non-transitory computer-readable medium.

The input component 550 enables the device 500 to receive input, such as user input and/or sensed inputs. For example, the input component 550 may include a touch screen, a keyboard, a keypad, a mouse, a button, a microphone, a switch, a sensor, a global positioning system component, an accelerometer, a gyroscope, and/or an actuator.

The output component 560 enables the device 500 to provide output, such as via a display, a speaker, and/or one or more light-emitting diodes. The communication component 570 enables device 500 to communicate with other devices, such as via a wired connection and/or a wireless connection. For example, the communication component 570 may include a receiver, a transmitter, a transceiver, a modem, a network interface card, and/or an antenna.

The device 500 may perform one or more processes described herein. For example, a non-transitory computer-readable medium (e.g., the memory 530 and/or the storage component 540) may store a set of instructions (e.g., one or more instructions, code, software code, and/or program code, among other examples) for execution by the processor 520. The processor 520 may execute the set of instructions to perform one or more processes described herein. In some implementations, execution of the set of instructions, by one or more of the processors 520, causes the one or more of the processors 520 and/or the device 500 to perform one or more processes described herein. In some implementations, hard-wired circuitry may be used instead of, or in combination with, the instructions to perform one or more processes described herein. Thus, implementations described herein are not limited to any specific combination of hardware circuitry and software.

The number and arrangement of components shown in FIG. 5 are provided as an example. The device 500 may include additional components, fewer components, different components, or differently arranged components than those shown in FIG. 5. Additionally, or alternatively, a set of components (e.g., one or more components) of the device 500 may perform one or more functions described as being performed by another set of components of the device 500.

Figure 6:
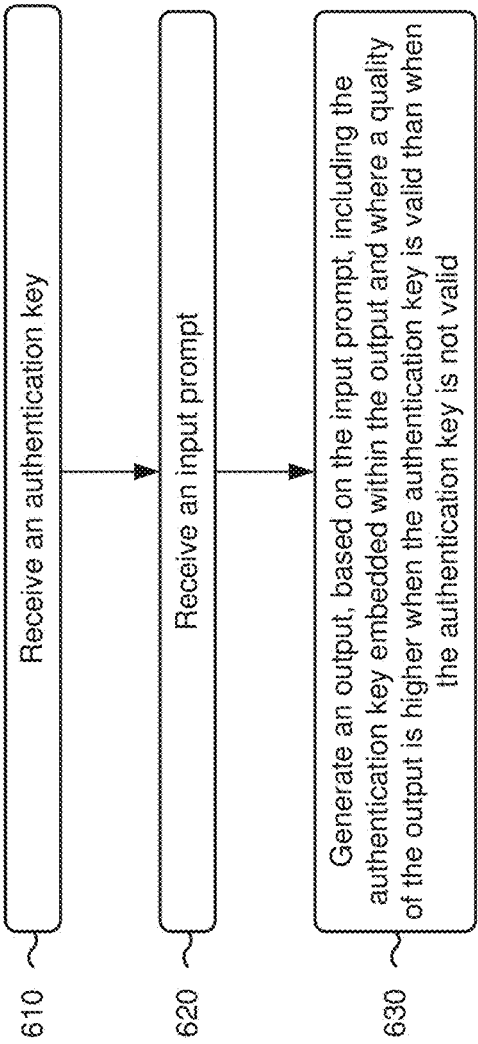
FIG. 6 is a flowchart of an example process relating to key-based generative artificial intelligence model content generation.

FIG. 6 is a flowchart of an example process 600 associated with enhanced generative AI model authentication. In some implementations, one or more process blocks of FIG. 6 may be performed by the generative AI system 102, the user device 104, the server device 106, the generative AI system 401, the one or more elements 403-413, the user device 430, and/or the server device 440. In some implementations, one or more process blocks of FIG. 4 may be performed by another device, or a group of devices separate from or including the generative AI system 102, the user device 104, the server device 106, the generative AI system 401, the one or more elements 403-413, the user device 430, and/or the server device 440. Additionally, or alternatively, one or more process blocks of FIG. 4 may be performed by one or more components of the device 500, such as processor 520, memory 530, input component 540, output component 550, and/or communication component 560.

As shown in FIG. 6, the process 600 includes receiving an authentication key (block 610). For example, the pre-trained generative AI model may receive the authentication key (e.g., via the user device 104), as described in more detail elsewhere herein. The authentication key may be used to authenticate use of the pre-trained generative AI model before a user is provided with access to the pre-trained generative AI model, during use of the pre-trained generative AI model, or after a user is provided with access to the pre-trained generative AI model, as described in more detail elsewhere herein.

As further shown in FIG. 6, the process includes receiving an input prompt (block 620). For example, the pre-trained generative AI model may receive the input prompt (e.g., via the user device 104), as described in more detail elsewhere herein.

As further shown in FIG. 6, the process 600 includes generating an output, based on the input prompt, including the authentication key embedded within the output and where a quality of the output is higher when the authentication key is valid than when the authentication key is not valid (block 630) For example, the pre-trained generative AI model may generate an output, based on the input prompt, including the authentication key embedded within the output and where a quality of the output is higher when the authentication key is valid than when the authentication key is not valid, as described in more detail elsewhere herein.

In some implementations, the pre-trained generative AI model may receive metadata and embed the metadata within the output. In some implementations, the metadata includes at least one a generative AI model name, a generative AI model version, and/or a timestamp of generation of the output. In some implementations, the quality of the output may be altered from a higher quality to a lower quality when the authentication key is not valid. In some implementations, access to the pre-trained generative AI model is at least one of a server-side access, and/or a client-side access.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code-it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method for generating an output of a generative artificial intelligence (AI) model using an authentication key, the method comprising:
receiving, by a device, an authentication key associated with authenticating use of the generative AI model;
receiving, by the device, an input prompt;
generating, by the device and using the generative AI model, an output based on the input prompt,
wherein generating the output includes embedding the authentication key within the output, and
wherein a quality of the output is higher when the authentication key is valid than when the authentication key is not valid.

2. The method of claim 1, wherein the use of the model is authenticated by receiving the authentication key after access to the generative AI model has been provided.

3. The method of claim 1, wherein the output includes at least one of:
an image output,
an audio output,
a text output,
a video output,
a multimodal output, or
a synthetic content output.

4. The method of claim 1, further comprising:
receiving, by the device, metadata,
wherein generating the output includes embedding the metadata within the output.

5. The method of claim 4, wherein the metadata includes at least one of:
a generative AI model name,
a generative AI model version, or
a timestamp of generation of the output.

6. The method of claim 1, wherein the quality of the output is altered from a higher quality to a lower quality when the authentication key is not valid.

7. The method of claim 1, wherein access to the generative AI model is at least one of:
a server-side access, or
a client-side access.

8. A system for generating an output of a generative artificial intelligence (AI) model using an authentication key, the system comprising:
one or more memories; and
one or more processors, communicably coupled to the one or more memories, configured to:
receive an authentication key associated with authenticating use of the generative AI model;
receive an input prompt;
generate, using the generative AI model, an output based on the input prompt,
wherein generating the output includes embedding the authentication key within the output, and
wherein a quality of the output is higher when the authentication key is valid than when the authentication key is not valid.

9. The system of claim 8, wherein the use of the model is authenticated by receiving the authentication key after access to the generative AI model has been provided.

10. The system of claim 8, wherein the output includes at least one of:
an image output,
an audio output,
a text output, a video output, a multimodal output, or a synthetic content output.

11. The system of claim 8, wherein the one or more processors are further configured to:

receive metadata, wherein generating the output includes embedding the metadata within the output.

12. The system of claim 11, wherein the metadata includes at least one of:

a generative AI model name, a generative AI model version, or a timestamp of generation of the output.

13. The system of claim 8, wherein the quality of the output is altered from a higher quality to a lower quality when the authentication key is not valid.

14. The system of claim 8, wherein access to the generative AI model is at least one of:

a server-side access, or a client-side access.

15. A method for generating an output of a generative artificial intelligence (AI) model using an authentication key, the method comprising:

receiving, by a device, an authentication key;

authenticating, by the device and based on the authentication key, use of the generative AI model by a user prior to the user gaining access to the generative AI model;

receiving, by a device, an input prompt;

generating, by the device and using the generative AI model, an output based on the input prompt, wherein generating the output includes embedding the authentication key within the output, and wherein a quality of the output is higher when the authentication key is valid than when the authentication key is not valid.

16. The method of claim 15, wherein the output includes at least one of:

an image output, an audio output, a text output, a video output, a multimodal output, or a synthetic content output.

17. The method of claim 15, wherein the quality of the output is altered from a higher quality to a lower quality when the authentication key is not valid.

18. A system for generating an output of a generative artificial intelligence (AI) model using an authentication key, the system comprising:

one or more memories; and one or more processors, communicably coupled to the one or more memories, configured to:

receive an authentication key;

authenticate, based on the authentication key, use of the generative AI model by a user prior to the user gaining access to the generative AI model;

receive an input prompt;

generate, using the generative AI model, an output based on the input prompt, wherein generating the output includes embedding the authentication key within the output, and wherein a quality of the output is higher when the authentication key is valid than when the authentication key is not valid.

19. The system of claim 18, wherein the output includes at least one of:

an image output, an audio output, a text output, a video output, a multimodal output, or a synthetic content output.

20. The system of claim 18, wherein the quality of the output is altered from a higher quality to a lower quality when the authentication key is not valid.

* * * * *